United States Patent
Brown et al.

(10) Patent No.: US 6,407,669 B1
(45) Date of Patent: Jun. 18, 2002

(54) RFID TAG DEVICE AND METHOD OF MANUFACTURING

(75) Inventors: Katherine A. Brown, Lake Elmo; James N. Dobbs, Woodbury; William C. Egbert, Minneapolis; Luther E. Erickson, Grant; John S. Huizinga, Dellwood; Gregory F. King, Minneapolis, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/776,245

(22) Filed: Feb. 2, 2001

(51) Int. Cl.[7] ............................................... G08B 13/14
(52) U.S. Cl. .............................. 340/572.1; 340/572.4; 340/572.5; 340/572.9; 340/686.4; 340/10.1
(58) Field of Search ......................... 340/572.1, 572.4, 340/572.5, 572.7, 572.6, 572.9, 673, 686.2, 686.4, 10.42, 572.8, 10.1

(56) References Cited

U.S. PATENT DOCUMENTS

| 4,369,557 A | | 1/1983 | Vandebult |
| 4,658,264 A | | 4/1987 | Baker |
| 4,694,283 A | * | 9/1987 | Reeb .......................... 340/572.1 |
| 4,792,790 A | * | 12/1988 | Reeb .......................... 340/572.1 |
| 5,291,180 A | * | 3/1994 | Reeb .......................... 340/572.1 |
| 5,608,246 A | * | 3/1997 | Yeager et al. ................ 257/295 |

FOREIGN PATENT DOCUMENTS

| JP | 07-45441 | 2/1995 |
| JP | 08-44964 | 2/1996 |
| JP | 10-92690 | 4/1998 |

\* cited by examiner

Primary Examiner—Jeffery Hofsass
Assistant Examiner—Daniel Previl
(74) Attorney, Agent, or Firm—James V. Lilly

(57) ABSTRACT

Folded radio frequency identification tag devices and methods for high-volume, low-cost production are disclosed. The folded construction of the devices and methods of the present invention can reduce the complexity of the RFID tags by providing a one-sided circuit design. The resonant frequency of the circuits formed on the devices may be tuned by severing selected connections to one or more tuning capacitor plates that form a part of the capacitor structure. Severing connections to the tuning capacitor plates changes the capacitance of the circuit which, in turn, changes the resonant frequency of the circuit.

31 Claims, 6 Drawing Sheets

RFID TAG DEVICE AND METHOD OF MANUFACTURING

FIELD OF THE INVENTION

The present invention relates generally to Radio Frequency Identification (RFID) Tags and the methods of producing such tags.

BACKGROUND OF THE INVENTION

The design of a typical RFID tag reflects its origin in the semiconductor and printed circuit board industries. Although functional, the design has a number of features that increase the cost of the finished article. In a resonant RFID tag, the electrical inductance of an antenna is connected in parallel with a capacitor such that the resonant frequency of the thus-formed circuit is tuned to a prescribed value. In more advanced forms, the circuit of the RFID tag may include an integrated circuit die electrically and mechanically bonded to the antenna on a substrate, wherein the voltage induced in/on the antenna by a reader signal provides power to operate the integrated circuit on the die.

The antenna typically includes a metal coil pattern on one side of a substrate, and metallization on the second side of the substrate to cross over the antenna, i.e., bring the outer connection of the multi-turn antenna coil back to the open unpatterned area in the center, where the die is typically located and bonded. Vias, i.e., electrical connections through the substrate, connect the first side metallization to the second side metallization. Typically one connection is made at the outer perimeter of the antenna to the second side metallization, and a second connection interior to the antenna coil brings the second side metallization in contact with the die bonding pad on the first (coil) side metallization.

The die is bonded between the antenna and second side metallization such that it completes the circuit between the ends of the antenna. The antenna center frequency is often tuned by laser-trimming the area of a capacitor plate formed between the first surface and second surface metallization.

Several problems exist with the current method of manufacturing RFID tags. For example, because metallization is formed on both the front and back sides of the substrate, alignment between the two sides is crucial. Aligning the two sides presents challenges that are difficult to overcome and are costly. In addition, where the front side to back side alignment is not accurate, fabrication yield can be reduced.

SUMMARY OF THE INVENTION

The present invention provides folded radio frequency identification (RFID) tag devices and methods for high-volume, low-cost production. The folded construction of the devices and methods of the present invention presents a number of advantages over the prior art. For example, the present invention reduces the complexity of the typical two-sided RFID tag with through-substrate via connections by providing a one-sided circuit design. This obviates the need for through-substrate via connections, while also addressing front side to back side alignment issues.

Another advantage of the devices and methods of the present invention is that the resonant frequency of circuits formed on the RFID tag devices of the present invention may be tuned by severing selected connections to one or more tuning capacitor plates that form a part of the capacitor structure. Severing connections to the tuning capacitor plates changes the capacitance of the circuit which, in turn, changes the resonant frequency of the circuit.

This invention may also reduce the number of connections in the RFID tag. The reduced number of connections may improve initial reliability and manufacturing process yield. In addition, fewer connections may also limit the sites of potential failure due to long-term aging conditions.

Another advantage of the present invention is that the process of folding the substrate can simultaneously form the end-to-end connection for the antenna loop and the capacitor structure. The folding process may be automated if so desired.

The devices and methods of the invention can be used to manufacture RFID tag device that do not include an integrated circuit die for use as Electronic Article Surveillance (EAS) devices. Such devices may be deactivated by methods known in the art, such as exposing the device to a high intensity electromagnetic field at the resonance frequency. The large voltage induced in the circuit on the device may drive a current through any conductive medium used to join the circuit at the connection pads that is large enough to destroy the required electrical interconnection. Alternatively, the large voltage induced in the circuit may cause a conductive channel to form in the dielectric layer of the capacitor, thus destroying or changing the capacitance of the circuit. After deactivation, the device will no longer significantly interact with the electromagnetic field at the operating frequency of the inquiring system. Conversely, if the device is not deactivated, it will interact with a sensing field to indicate that an article is being removed from a controlled area.

In some embodiments of the present invention, an integrated circuit die may be attached to a die connection site that forms a part of the circuit, thus forming an RFID tag device including additional functions or features, e.g., memory, etc. The die connection site may, in some embodiments, include die connection terminals that are made by separating an integrated die connection pad before attaching the die. If desired, the deactivation methods described above may also be used to deactivate RFID tag devices that incorporate an integrated circuit die.

The circuit patterns may be formed on a continuous web that can be separated to provide a number of individual RFID tag devices. The circuit patterns could be complete prior to separation of the web, or the circuit patterns could be partially formed, separated from the web, and then completed. Alternatively, a die could be attached at the die connection site either before or after the web is separated into the individual RFID tag devices.

In one aspect, the present invention provides a method for fabricating a radio frequency identification tag device. The method includes providing a substrate with first and second major surfaces, wherein a first portion of the substrate forms a connector tab. A circuit pattern is provided on a first major surface of a substrate, the circuit pattern including an antenna pattern having first and second ends; a first connection pad and a second connection pad, wherein the first connection pad is located on the first major surface of the substrate within the connector tab. The circuit pattern also includes a common capacitor plate in electrical communication with the antenna pattern; and a plurality of tuning capacitor plates, each of the tuning capacitor plates in electrical communication with the antenna pattern through a tuning capacitor plate connection. The method further includes folding the connector tab along a connector tab fold line such that the first major surface of the substrate within the connector tab faces the first major surface of the substrate outside of the connector tab; wherein the plurality of tuning capacitor plates are located on the connector tab or the common capacitor plate is located on the connector tab such that the plurality of tuning capacitor plates and the common capacitor plate form a capacitor after the folding; and wherein the first connection pad faces the second connection pad after the folding.

In another aspect, the present invention provides a method for fabricating a radio frequency identification tag device on a substrate with first and second major surfaces, wherein a first portion of the substrate forms a connector tab. The method further includes providing a circuit pattern on a first major surface of a substrate. The circuit pattern includes an antenna pattern with first and second ends; a first connection pad and a second connection pad, wherein the first connection pad is located on the first major surface of the substrate within the connector tab; a common capacitor plate in electrical communication with the antenna pattern; and a plurality of tuning capacitor plates, each of the tuning capacitor plates in electrical communication with the antenna pattern through a tuning capacitor plate connection. The method also includes folding the connector tab along a connector tab fold line such that the first major surface of the substrate within the connector tab faces the first major surface of the substrate outside of the connector tab, wherein the plurality of tuning capacitor plates are located on the connector tab or the common capacitor plate is located on the connector tab such that the plurality of tuning capacitor plates and the common capacitor plate are located opposite each other after the folding, and further wherein the first connection pad faces the second connection pad after the folding. A dielectric layer is located between the common capacitor plate and each of the tuning capacitor plates, wherein the common capacitor plate and the tuning capacitor plates are separated by the dielectric layer after the folding. The first connection pad is placed in electrical communication with the second connection pad; the resonant frequency of the device is measured; and at least one of the tuning capacitor plate connections is selectively severed such that a desired resonant frequency is obtained.

In another aspect, the present invention provides a radio frequency identification tag device that includes a substrate with first and second major surfaces, a first portion of the substrate forming a connector tab, wherein the substrate is folded along a connector tab fold line such that the first major surface of the substrate located within the connector tab faces the first major surface of the substrate outside of the connector tab. The device further includes an antenna located on the first major surface of the substrate; a first connection pad located on the first major surface of the substrate within the connector tab; a second connection pad located on the first major surface of the substrate outside of the connector tab, wherein the first and second connection pads face each other and are in electrical communication with each other. The device further includes a capacitor with a common capacitor plate in electrical communication with the antenna and a plurality of tuning capacitor plates separated from the common capacitor plate by a dielectric layer, each of the plurality of the tuning capacitor plates in electrical communication with the antenna through a tuning capacitor plate connection, wherein only one of the common capacitor plate or the plurality of tuning capacitor plates is located within the connector tab.

In another aspect, the present invention provides a radio frequency identification tag device including a substrate with first and second major surfaces, a first portion of the substrate forming connector tab defined by a connector tab fold line and a separation line formed in the substrate, wherein the substrate is folded along the connector tab fold line such that the first major surface of the substrate located within the connector tab faces the first major surface of the substrate outside of the connector tab. The device also includes an antenna located on the first major surface of the substrate; a first connection pad located on the first major surface of the substrate within the connector tab; and a second connection pad located on the first major surface of the substrate outside of the connector tab, wherein the first and second connection pads face each other and are in electrical communication with each other. Also included in the device is a capacitor having a common capacitor plate in electrical communication with the antenna and a plurality of tuning capacitor plates separated from the common capacitor plate by a dielectric layer, each of the plurality of the tuning capacitor plates in electrical communication with the antenna through a tuning capacitor plate connection, wherein only one of the common capacitor plate or the plurality of tuning capacitor plates is located within the connector tab. The device further includes at least one disconnected tuning capacitor plate located opposite the common capacitor plate and separated from the common capacitor plate by the dielectric layer, wherein the disconnected tuning capacitor plate is not in electrical communication with the antenna.

These and other features and advantages of the invention are described below with respect to illustrative embodiments of the invention.

DETAILED DESCRIPTION OF ILLUSTRATIVE EMBODIMENTS OF THE INVENTION

Figure 1:
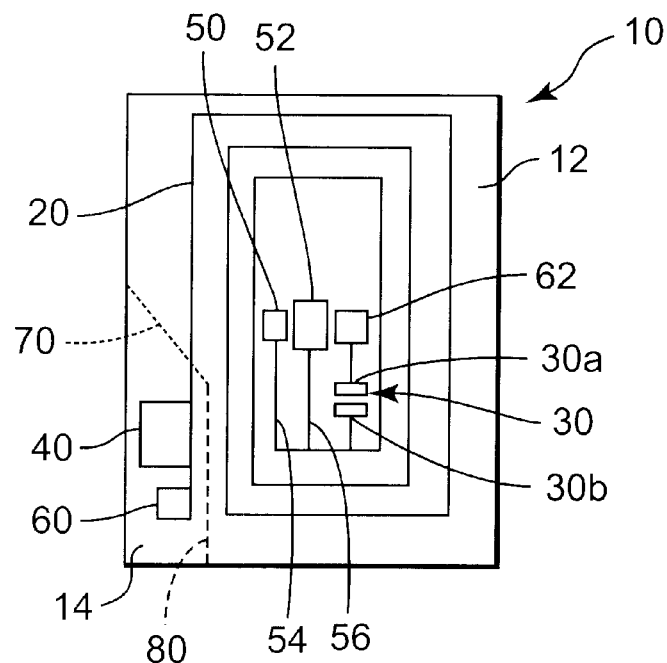
FIG. 1 is a plan view of one device according to the present invention.
Figure 2:
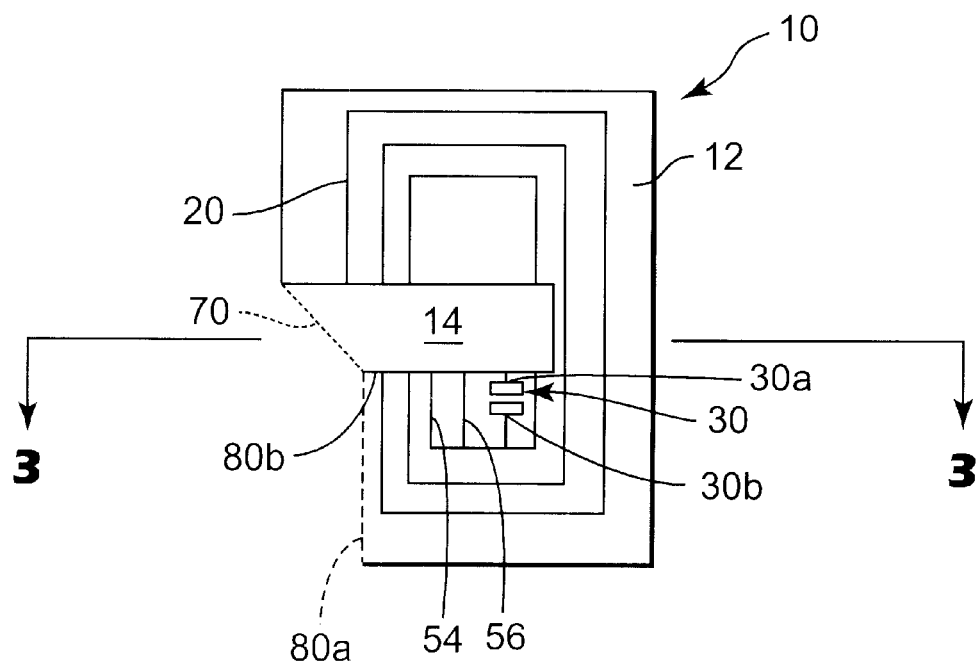
FIG. 2 is a plan view the device of FIG. 1, with the connector tab folded over.
Figure 3:
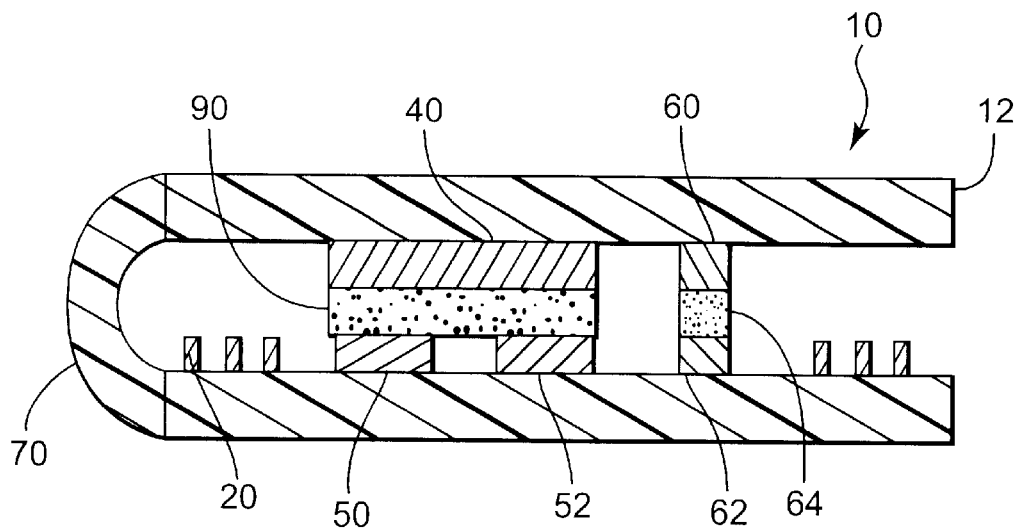
FIG. 3 is a cross-section view of the device of FIG. 2, taken along line 3—3 in FIG. 2.

With reference to FIGS. 1–3, one RFID tag device according to the present invention and a method of making the device in accordance with the present invention shall be described. Although the illustrated device may preferably be a resonant radio frequency identification tag, it will be understood that the present invention may be used to manufacture any radio frequency identification tag including an antenna and capacitor as discussed herein.

The device 10 includes a circuit pattern on one major surface of the substrate 12. The circuit pattern includes an antenna 20, an optional die connection site 30 in electrical communication with one end of the antenna 20, a first connection pad 60 in electrical communication with the opposite end of the antenna 20, and a second connection pad 62 in electrical communication with the die connection site 30 (which would place the second connection pad 62 in electrical communication with the opposite end of the antenna when an integrated circuit die was provided at the die connection site 30 as discussed more completely below). If the circuit pattern did not include the optional die connection site 30, the second connection pad 62 would be in direct electrical communication with the opposite end of the antenna 20.

The circuit pattern also includes a common capacitor plate 40 and two or more tuning capacitor plates 50 and 52 in electrical communication with the antenna through tuning capacitor plate connections 54 and 56, respectively.

All of the components of the circuit pattern are located on the same major surface of the substrate 12. As a result, vias formed through the substrate 12 are not required to make the necessary electrical connections between the different components of the circuit pattern. Rather, the connections needed to convert the pattern into a circuit are made by folding the substrate 12 as described in more detail below.

The substrate 12 can be manufactured from any suitable material or materials. Suitable materials for substrate 12 may preferably exhibit certain characteristics. For example, the substrate 12 may preferably be non-conductive between the various components of the circuit pattern to prevent shorting between them. It is preferred that the substrate 12 and at least a portion of the circuit pattern be flexible such that portions of the substrate 12 can be folded over onto each other without severing any required electrical connections and/or fracturing the substrate 12. Examples of suitable substrate materials include, but are not limited to, papers, polymeric materials (e.g., polyethylene, polypropylene, polyesters (e.g., PEN, PET, etc.), polyimides, polyacrylates, polystyrene, etc.), and others. Furthermore, although substrate 12 is depicted as a homogeneous structure (see FIG. 3), it should be understood that the substrate 12 may be constructed of two or more different materials provided as different layers or otherwise.

The circuit pattern on device 10 may be manufactured utilizing a variety of techniques for forming electrically conductive patterns. The circuit pattern may, for example, be formed using standard printed circuit methods, wherein an original stencil pattern is screen printed with an etch resistant ink onto a metal layer, and the non-ink coated portions are subsequently etched away. Other techniques suitable for providing electrically conductive patterns may similarly be utilized, such as metal foil patterned by photo-resist/etch techniques, laser ablation, etc. Another suitable technique may, for example, involve stenciling or printing of conductive ink onto the substrate 12. In still other techniques, the circuit pattern may be built up by pattern-wise plating onto, e.g., a metal foil, seed layer, conductive ink layer, etc.

Further, the different components of the circuit pattern may all be manufactured by one technique or, alternatively, two or more different manufacturing techniques may be used to complete a single circuit pattern, with the techniques being selected based on, e.g., the resulting electrical characteristics, resolutions, etc.

The antenna 20 is one component of the circuit pattern located on the first major surface of the substrate 12. The specific design of the antenna 20 is not critical to the present invention. For example, the number of coils formed in the antenna 20, the spacing between the coils, the thickness/width of the coils, and other design parameters may vary as required to obtain the desired electrical characteristics.

In electrical communication with the antenna 20 is an optional die connection site 30, including die connection terminals 30a and 30b. It should be noted that only those devices 10 that will be used with an integrated circuit die need to include the die connection site 30 as a part of the circuit pattern.

The connection terminals 30a and 30b of the die connection site 30 are preferably large enough and in the proper positions to make contact with the terminals on an integrated circuit die to be used in connection with the device 10. Although the depicted die connection site 30 includes two terminals, it will be understood that the die connection site 30 may include any desired number of terminals as required by the integrated circuit die to be attached to the site 30.

Also a part of the circuit pattern, a common capacitor plate 40 is also located on the first major surface of substrate 12 and is in electrical communication with the antenna 20. The common capacitor plate 40 is located on a portion of the substrate 12 that forms a connector tab 14. In the depicted embodiment, the connector tab 14 is defined by a separation line 80 and a fold line 70.

The common capacitor plate 40 connects to the antenna 20 across the fold line 70 and, as a result, at least that portion of the circuit pattern is flexible enough to withstand the bending associated with folding (such that the electrical connection between the common capacitor plate 40 and the antenna 20 is maintained after folding).

A number of tuning capacitor plates 50 and 52 are also located on the same major surface of the substrate 12, and are in electrical communication with the antenna 20 through tuning capacitor plate connections 54 and 56. The tuning capacitor plates 50 and 52 allow for tuning of the resonant frequency of the device 10 by selective severing of the tuning capacitor plate connections 54 and 56 as discussed in more detail below.

The tuning capacitor plates 50 and 52 are located outside of the connector tab 14 such that folding (as discussed below) places the common capacitor plate 40 in opposition to the tuning capacitor plates 50 and 52 to form a capacitor. Alternatively, it will be understood that the positions could potentially be reversed, with the tuning capacitor plates being located on the connector tab and the common capacitor plate located outside of the connector tab.

The common capacitor plate 40 may preferably be larger in area than each of the tuning capacitor plates 50 and 52. More preferably, the common capacitor plate 40 is large enough to offer a conductive surface opposite all of the tuning capacitor plates 50 and 52 after folding of the substrate 12 as discussed below. Although only two tuning capacitor plates 50 and 52 are provided in the depicted embodiment, it will be understood that it may be preferred to provide three or more tuning capacitor plates to provide additional tuning flexibility. Further, the tuning capacitor plates may be the same size or different sizes as desired for still more flexibility.

In addition, although it may be preferred to provide only a single common capacitor plate 40 as depicted in connection with this illustrative embodiment, it may be possible to provide more than one common capacitor plate, with each common capacitor plate located (in a completed device) opposite one or more of the tuning capacitor plates.

The circuit pattern also includes a first connection pad 60 located within the connection tab 14 on the substrate 12, and a second connection pad 62 located outside of the connection tab 14. During manufacturing of the devices of the present invention, the connector tab 14 formed as a portion of the substrate 12 can be folded along fold line 70 such that the first connection pad 60 can be placed in electrical communication with the second connection pad 62. That manufacturing process may also require the formation of a separation line 80 in the substrate 12. The separation line 80 may be formed by any suitable technique or combination of techniques, e.g., cutting, perforating, tearing, scoring, etc.

The length and/or orientation of the fold line 70 and the separation line 80 are selected such that the components present on the connector tab 14 align with selected components of the circuit pattern on the substrate 12 outside of the connector tab 14 after folding. In the depicted embodiment, the fold line 70 forms an included angle with the separation line 80 of about 135°, although the angle selected may vary so long as the circuit components align properly. In some embodiments, folding along fold line 70 may be facilitated by, e.g., scoring the substrate 12.

FIG. 2 depicts the device 10 of FIG. 1 after folding of the connector tab 14 along fold line 70 in which the capacitor plates 40, 50, and 52, as well as connection pads 60 and 62 are hidden by the connector tab 14. Folding of the connector tab 14 brings the portion of the major surface of substrate 12 containing the circuit pattern components within the connector tab 14 into a position facing the same major surface of the substrate 12 outside of the connector tab 14. Folding the connector tab 14 also preferably results in the formation of a capacitor by bringing the common capacitor plate 40 and the tuning capacitor plates 50 and 52 to positions facing each other. The connection pads 60 and 62 may also preferably be brought into alignment to complete their connection as a result of the folding of connector tab 14.

FIG. 3 is a cross-sectional view of the device 10 of FIG. 2 taken along line 3—3 in FIG. 2. In this view, a dielectric layer 90 is depicted between the common capacitor plate 40 and each of the tuning capacitor plates 50 and 52.

The dielectric layer 90 is depicted as being continuous, although it will be understood that the dielectric layer 90 may be provided only in those areas in which the tuning capacitor plates 50 and 52 are located opposite the common capacitor plate 40.

The dielectric layer 90 may also preferably extend towards the fold line 70 such that it prevents the trace line connecting the common capacitor plate 40 to the antenna 20 from electrically shorting along each of the coils crossed by the folded connector tab 14. For example, it may be preferred to provide a dielectric layer 90 between substantially all of the connector tab 14 and the opposing portion of the substrate 12 after folding (so long as the connection pads 60 and 62 are not prevented from electrical communication as discussed below). Alternatively, a different insulating material may be provided to prevent shorting of the antenna 20 after folding of the connector tab 14.

The dielectric layer 90 can include, but is not limited to, for example, a non-conductive adhesive film, double-sided adhesive tape on a dielectric backing, a coating (e.g., paint, epoxy, solder mask, etc.), etc. Preferably, the dielectric 90 has a desirable dielectric constant to obtain the required capacitance for the circuit. The dielectric layer 90 may also exhibit sufficient adhesion to maintain the connector tab 14 in the folded position.

Figure 3A:
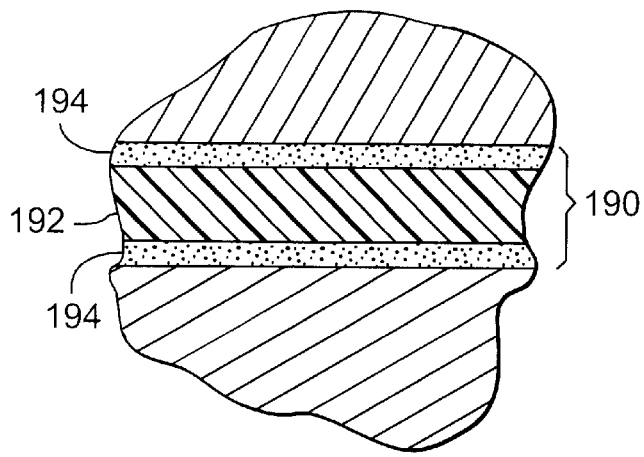
FIG. 3a is a cross-sectional view of one capacitor structure that may be used in connection with the present invention.

FIG. 3a depicts one embodiment of a dielectric layer 190 that includes a backing 192 with adhesive 194 located on both major surfaces of the backing 192. The backing 192 may provide desired electrical and/or structural properties while the adhesive may provide desired electrical and/or adhesive properties. The dielectric layer 190 may be provided in the form of a double-sided adhesive tape with pressure sensitive adhesive 194 on both sides of backing 192, e.g., pressure sensitive acrylic adhesive on a PET backing. In other variations, the backing 192 may be a polyimide film including, e.g., thermoset adhesive films 194 laminated to both major surfaces of the backing 192.

Referring back to FIG. 3, the folding of connector tab 14 also preferably places the first connection pad 60 in position opposite the second connection pad 62 such that an electrical connection can be made between the pads 60 and 62. In the depicted embodiment, the electrical connection between the first and second connection pads 60 and 62 may be accomplished by, e.g., a conductive medium 64. The conductive medium 64 may take any number of a variety of forms including, but not limited to, a conductive adhesive (e.g., EPOTEK E3116 available from Epoxy Technology, Inc., Billerica, Mass.; 3M 5303R Z-Axis Adhesive Film available from 3M Company, St. Paul, Minn.; etc.), a conductive adhesive tape (e.g., 3M 9703 Electrically Conductive Tape available from 3M Company), solder, etc.

Figure 3B:
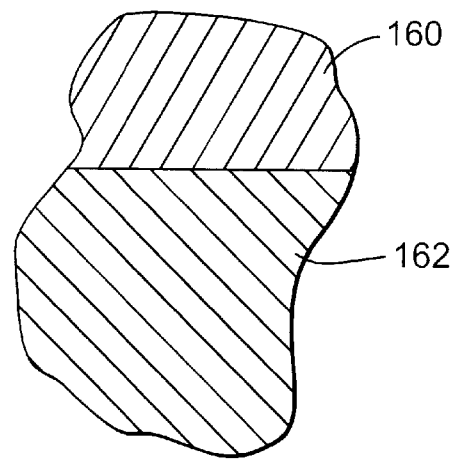
FIG. 3b is a cross-sectional view of one technique for electrically connecting the connector pads in a device according to the present invention.

In another alternative of an RFID tag device partially depicted in FIG. 3b, the connection pads 160 and 162 may be in direct contact with each other and both electrically and mechanically joined by an energy-assisted mechanical bond, such as with an ultrasonic or thermosonic probe.

Figure 4:
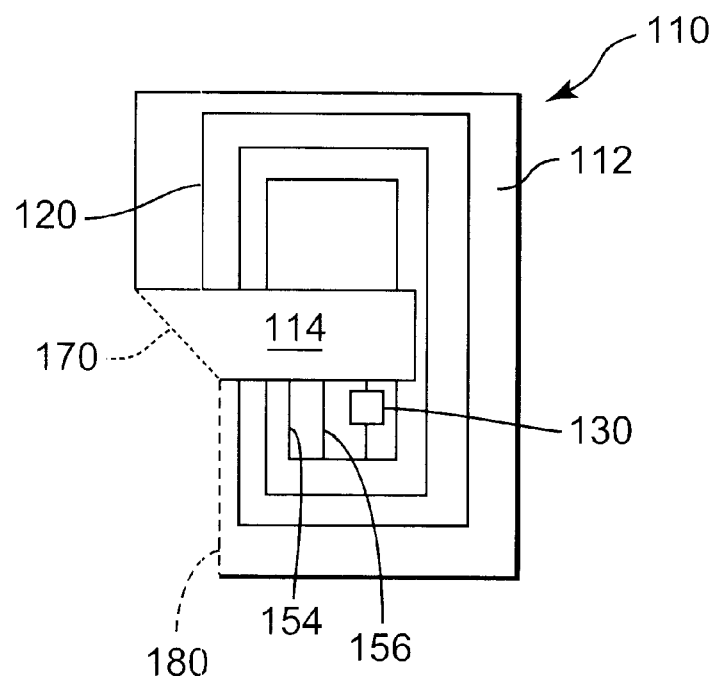
FIG. 4 is a plan view of an alternate embodiment of a device according to the present invention.

As illustrated in FIG. 4, another embodiment of the present invention includes a device 110 where the circuit pattern includes a die connection site in the form of an integrated die connection pad 130 that does not include separate die connection terminals. The integrated die connection pad 130 is provided in electrical communication with the antenna 120. When the die connection site is provided as an integral die connection pad 130, that pad 130 must be separated into the desired number of separate and distinct die connection terminals.

Alternatively, by providing a die connection site in the form of an integrated die connection pad 130 that is not separated into separate and distinct terminals when the circuit pattern is formed, the user has the option of later separating the integrated pad 130 into terminals as discussed below only if an integrated circuit die is to be attached to the device 110.

Alternatively, if the device 110 is to be manufactured into a radio frequency identification tag that does not include an integrated circuit die, then the integrated die connection pad can be left as shown in FIG. 4. Because the integrated die connection pad is not separated into terminals, the continuity of the circuit is not broken and the device 110 can be formed in the absence of any integrated circuit die.

Figure 5:
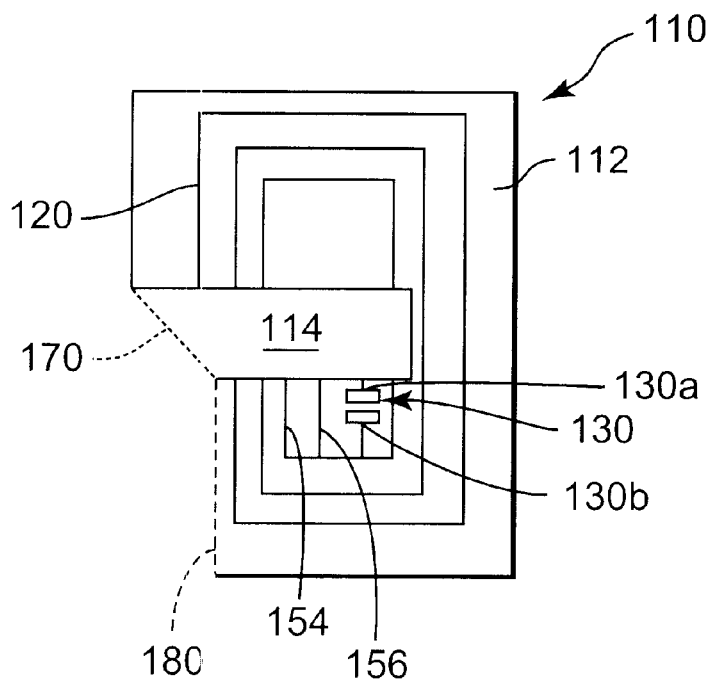
FIG. 5 is a plan view of an alternate embodiment of a device according to the present invention.

FIG. 5 depicts the device 110 of FIG. 4 after the integrated connection pad 130 has been separated into a number of die connection terminals 130a and 130b. Although only two die connection terminals 130a and 130b are depicted, it will be understood that any desired number of terminals may be formed as needed.

The process of separating the integrated die connection pad 130 into die connection terminals 130a and 130b may provide the advantage of a small gap between the die connection terminals 130a and 130b, thus permitting the use of a small (lower cost) die with small interconnect terminals. For example, the integrated die connection pad 130 (see FIG. 4) may be manufactured by a low resolution process, e.g., printing, that could not provide the desired small gap between the die connection terminals 130a and 130b. By forming the die connection terminals 130a and 130b from the integrated die connection pad 130 using a high resolution technique (e.g., laser ablation, electron beam devices, water jet cutting, etc.), however, the die connection terminals 130a and 130b can be accurately formed with the desired high resolution features, e.g., a narrow gap, etc. Without high resolution terminal-to-terminal spacing, the die connection terminals 130a and 130b would be at the same low resolution as the rest of the circuit, and the integrated circuit die itself would need to be larger to span the terminal-to-terminal gap.

FIGS. 4 and 5 also depict one method of tuning a radio frequency identification tag device according to the present invention. After the device 110 is manufactured as depicted in FIG. 4, the resonant frequency of the circuit thus formed can be measured with all the tuning capacitor plates connected. With the resonant frequency measured, at least one of the tuning capacitor plate connections 154 and 156 can be severed as depicted in FIG. 5 to disconnect the associated tuning capacitor plate, such that the remaining capacitance and coil inductance is resonant at the appropriate frequency. Where three or more tuning capacitor plates are provided, it may be possible to sever the tuning plate connections of more than one tuning capacitor plate to achieve the desired resonant frequency.

It should be noted that the area or size of the tuning capacitor plates (not shown) preferably remains unchanged during the tuning process. Rather, only the tuning capacitor plate connections 154 and 156 are severed to reduce the capacitance and, thereby, tune the resonant frequency of the tag 110. In some methods, it may, however, be possible to tune the resonant frequency of the device 110 by adjusting the size of one or more of the tuning capacitor plates or the common capacitor plate.

For a device incorporating an integrated circuit die, proper physical layout of the circuit may allow for severing of the selected tuning plate connections 154 and 156 and separation of the integrated die connection pad 130 into die connection terminals 130a and 130b in a single pass using the same technique. Separation of the die connection pad into die connection terminals and severing at least one tuning plate connection can be done using, e.g., laser energy, electron beam devices, etching, or physically removing material using a tool or other technique (e.g., water jet, blade, etc.).

Figure 6:
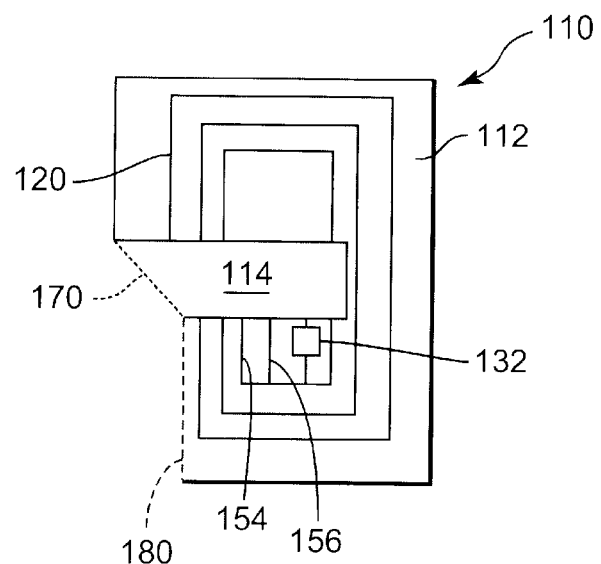
FIG. 6 is a plan view of an alternate embodiment of a device according to the present invention.

FIG. 6 shows the device 110 of FIG. 5 with a die 132 attached to the die connection pad 130. Attaching the die 132 to the die connection pad 130 can be accomplished utilizing any suitable technique; however, any technique utilized must be compatible with the die connection terminals described in the present invention. For example, an integrated circuit die may be connected using anisotropic conductive adhesives that form vertical connections between the connections on the integrated circuit die 132 and the underlying die connection terminals, while maintaining electrical isolation between the die connection terminals. In another alternative, the integrated circuit die 132 may be supplied with conductive bumps to penetrate a nonconductive adhesive and make electrical contact with the underlying die connection pads. The adhesive supplies a mechanical connection between the die 132 and substrate 112. In yet another alternative, the die 132 may be supplied with solder bumps on its pads. An electrical and mechanical connection is made by reflowing the solder to join the die pads to the corresponding die connection terminals.

Figure 7:
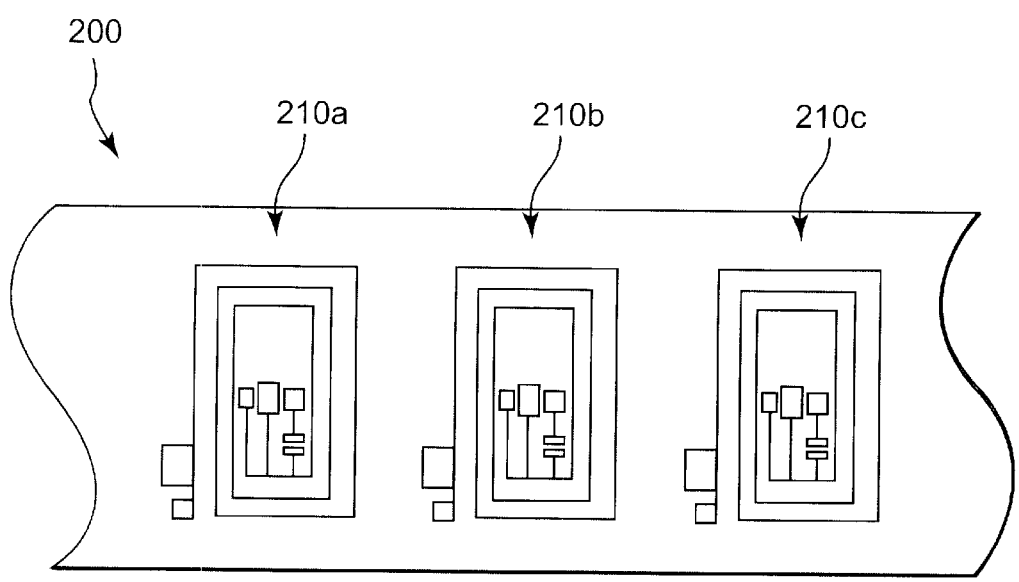
FIG. 7 is a plan view of an alternate embodiment of a device according to the present invention.

FIG. 7 illustrates another embodiment of the present invention. Here, a substrate web 200 includes a number of adjacent circuit patterns 210a, 210b, and 210c (referred to generally as patterns 210) spaced along the length of the web 200. The circuit patterns 210 may preferably include the same components as the individual circuit patterns described above. The web 200 can be separated between adjacent circuit patterns 210 to provide individual radio frequency identification tag devices. Each of the circuit patterns 210 may be completely formed before separation from the web 200. Alternatively, the circuit patterns 210 may be only partially formed before separation from the web 200 (followed by completion of the circuit patterns 210 after separation from the web 200). For example, it may be preferred to separate any integrated die connection pads into die connection terminals before or after separation of the circuit patterns 210 from web 200. It may also be preferred to locate and attach an integrated circuit die on each of the circuit patterns 210 before separation from the web 200.

The orientation and spacing between the circuit patterns 210 on substrate web 200 are exemplary only. For example, the circuit patterns 210 could be rotated 90 degrees from the orientation depicted in FIG. 7 (which may facilitate roll cutting and folding while in web form), they could be provided in a two-up configuration on the substrate web 200, etc.

Figure 8:
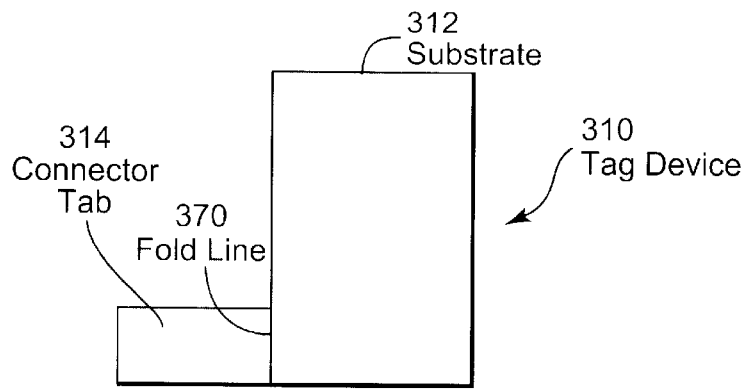
FIG. 8 is a plan view of an alternate embodiment of a device according to the present invention.
Figure 9:
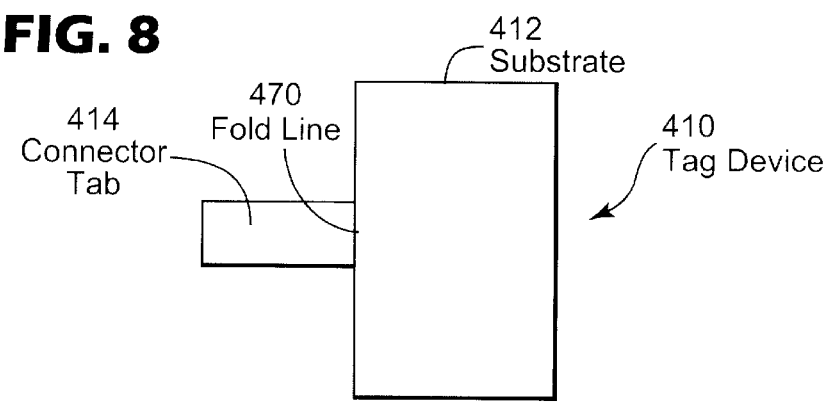
FIG. 9 is a plan view of an alternate embodiment of a device according to the present invention.

FIGS. 8 and 9 illustrate alternative embodiments of radio frequency identification tag devices according to the present invention. Although the devices depicted in FIGS. 1–7 have a generally uniform shape, many alternative embodiments exist. For example, FIG. 8 depicts an alternative shape for a radio frequency identification tag device 310 including a connector tab 314 connected to the remainder of the device 310 along a fold line 370. FIG. 9 depicts another alternative shape for a radio frequency identification tag device 410, in which a connector tab 414 is connected to the remainder of the device 410 along a fold line 470. Further, although depicted as rectilinear shapes, it will be understood that devices of the present invention may take any suitable shape.

Figure 10:
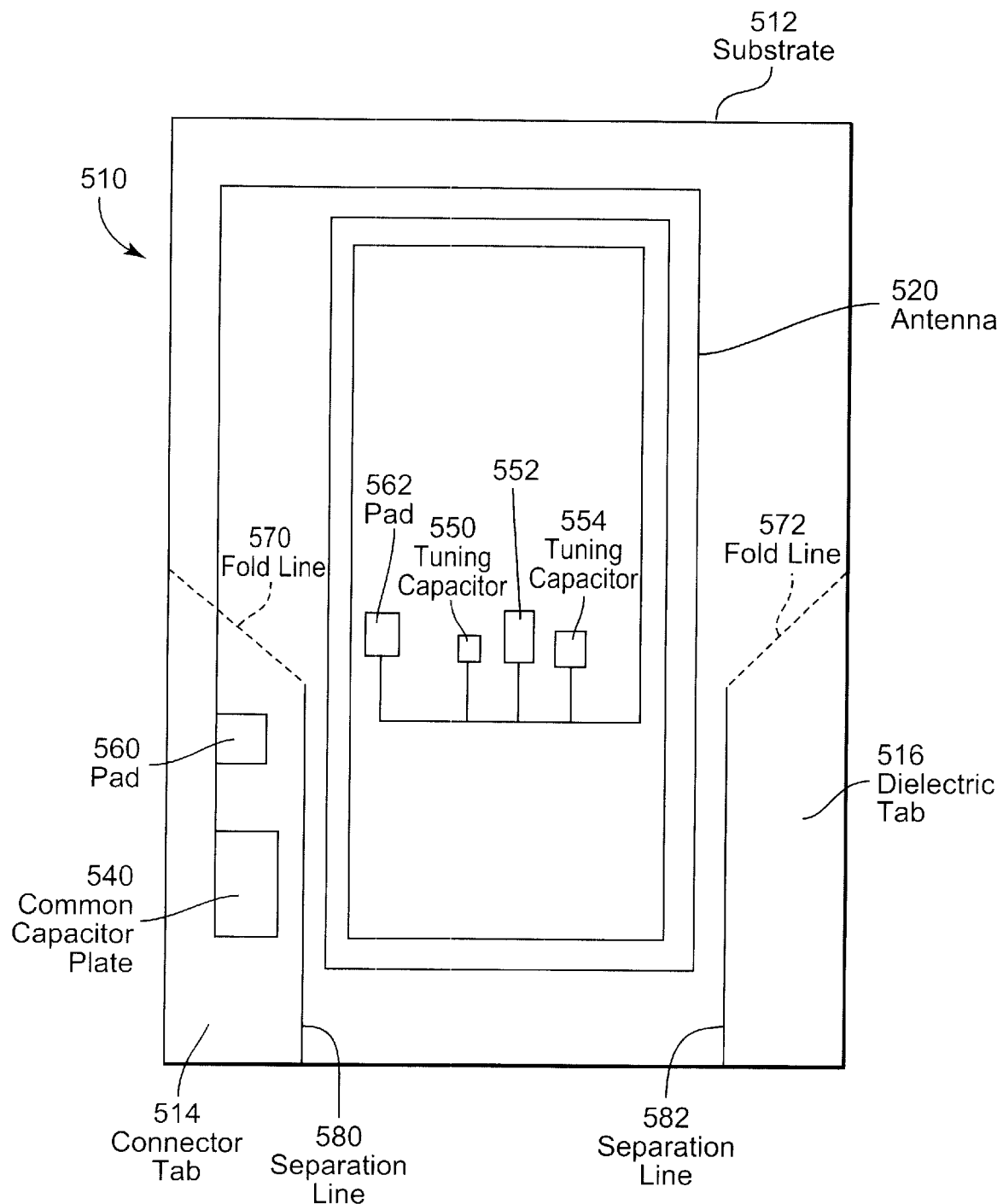
FIG. 10 is a plan view of an alternate embodiment of a device according to the present invention.

In yet another alternative embodiment, a radio frequency identification tag device 510 is depicted in FIG. 10 that includes a substrate 512 having both a connector tab 514 and a dielectric tab 516. The connector tab 514 has a construction similar to that of the various connector tabs described above, i.e., it is connected to the substrate 512 along a fold line 570 and is further defined by a separation line 580 that allows for folding of the connector tab 514 along the fold line to close the circuit and form a capacitor.

In the depicted device 510, the dielectric tab 516 is connected to the substrate 512 along a fold line 572 and may be further defined by a separation line 582. As a result, the dielectric tab 516 can be folded along its fold line 572 to provide a dielectric layer in the form of the substrate material between the common capacitor plate 540 and the tuning capacitor plates 550, 552, and 554. In this construction, the dielectric tab 516 would be folded first, followed by folding of the connector tab 514. Any suitable technique and/or materials could be used to hold the tabs 514 and 516 in place, e.g., adhesives, thermal welding, etc.

It may be necessary to remove a portion of the dielectric tab 516 to allow connection between the connection pads 560 and 562 to close the antenna 520 or, alternatively, a connection technique may be used that could pierce the dielectric tab 516 to make the necessary connection between the pads 560 and 562, e.g., the formation of an Insulation Displacement Via (IDV) as is known in the art.

Figure 11:
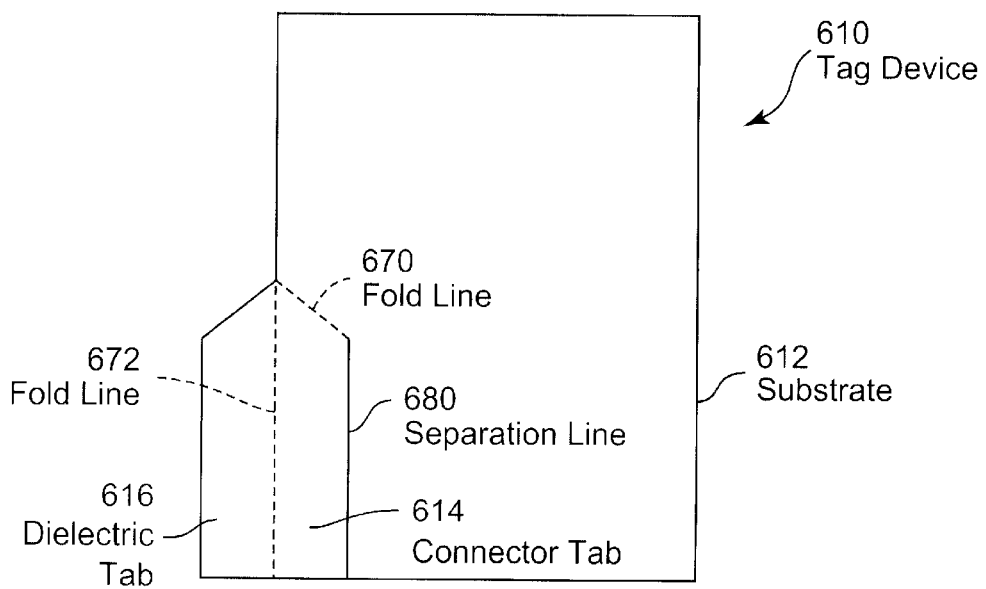
FIG. 11 is a plan view of an alternate embodiment of a device according to the present invention.

In another alternative device 610 depicted in FIG. 11, a dielectric tab 616 may be provided attached to the connector tab 614 along a fold line 672. In such an embodiment, the dielectric tab 616 would be folded over onto the connector tab 614 before the connector tab 614 was folded along its own fold line 670 (after separation from the substrate 612 along separation line 680).

Various modifications and alterations of this invention will become apparent to those skilled in the art without departing from the scope of this invention. Accordingly, it is to be understood that this invention is not to be limited to the illustrative embodiments set forth herein, but is to be controlled by the limitations set forth in the following claims and any equivalents thereof

What is claimed is:

1. A method for fabricating a radio frequency identification tag device, the method comprising:
   providing a substrate comprising first and second major surfaces, wherein a first portion of the substrate comprises a connector tab;
   providing a circuit pattern on a first major surface of a substrate, the circuit pattern comprising:
      an antenna pattern comprising first and second ends;
      a first connection pad and a second connection pad, wherein the first connection pad is located on the first major surface of the substrate within the connector tab;
      a common capacitor plate in electrical communication with the antenna pattern; and
      a plurality of tuning capacitor plates, each of the tuning capacitor plates in electrical communication with the antenna pattern through a tuning capacitor plate connection;
   folding the connector tab along a connector tab fold line such that the first major surface of the substrate within the connector tab faces the first major surface of the substrate outside of the connector tab;
   wherein the plurality of tuning capacitor plates are located on the connector tab or the common capacitor plate is located on the connector tab such that the plurality of tuning capacitor plates and the common capacitor plate form a capacitor after the folding; and
   wherein the first connection pad faces the second connection pad after the folding.

2. A method according to claim 1, further comprising:
   measuring a resonant frequency of the device; and
   selectively severing at least one of the tuning capacitor plate connections.

3. A method according to claim 1, wherein the circuit pattern further comprises a die connection site on the first major surface of the substrate, the die connection site in electrical communication with the antenna pattern.

4. A method according to claim 3, further comprising attaching a die to the die connection site.

5. A method according to claim 3, wherein the die connection site comprises an integrated die connection pad, and wherein the method further comprises separating the die connection site into a plurality of die connection terminals.

6. A method according to claim 1, further comprising locating a dielectric layer between the common capacitor plate and each of the tuning capacitor plates.

7. A method according to claim 6, wherein the dielectric layer comprises an adhesive.

8. A method according to claim 6, wherein the dielectric layer comprises a backing and adhesive located on each of two major surfaces of the backing.

9. A method according to claim 1, further comprising placing the first connection pad in electrical communication with the second connection pad.

10. A method according to claim 9, further comprising locating an electrically conductive material between the first and second connection pads.

11. A method according to claim 10, wherein the electrically conductive material comprises electrically conductive adhesive.

12. A method according to claim 9, wherein the first and second connection pads are in direct contact with each other.

13. A method according to claim 1, further comprising forming a separation line in the substrate before folding the connector tab, wherein the connector tab is defined by the connector tab fold line and the separation line.

14. A method according to claim 13, wherein forming the separation line comprises cutting through the substrate.

15. A method according to claim 1, wherein a second portion of the substrate forms a dielectric tab, and wherein the method comprises folding the dielectric tab along a dielectric tab fold line, and still further wherein the dielectric tab is located between the common capacitor plate and the plurality of tuning capacitor plates after folding of the dielectric tab and the connector tab.

16. A method according to claim 15, further comprising forming a separation line in the substrate before folding the dielectric tab, wherein the dielectric tab is defined by the dielectric tab fold line and the separation line.

17. A method according to claim 16, wherein forming the separation line comprises cutting through the substrate.

18. A method according to claim 1, wherein providing a substrate further comprises providing a substrate web comprising a plurality of first portions, each of the first portions comprising a connector tab, and further wherein the substrate web comprises a plurality of circuit patterns.

19. A method according to claim 18, further comprising separating the substrate web between adjacent circuit patterns.

20. A method according to claim 19, wherein the separating is performed before folding the connector tabs.

21. A method for fabricating a radio frequency identification tag device, the method comprising:
   providing a substrate comprising first and second major surfaces, wherein a first portion of the substrate comprises a connector tab;
   providing a circuit pattern on a first major surface of a substrate, the circuit pattern comprising:
      an antenna pattern comprising first and second ends;
      a first connection pad and a second connection pad, wherein the first connection pad is located on the first major surface of the substrate within the connector tab;
      a common capacitor plate in electrical communication with the antenna pattern; and
      a plurality of tuning capacitor plates, each of the tuning capacitor plates in electrical communication with the antenna pattern through a tuning capacitor plate connection;
   folding the connector tab along a connector tab fold line such that the first major surface of the substrate within the connector tab faces the first major surface of the substrate outside of the connector tab, wherein the plurality of tuning capacitor plates are located on the connector tab or the common capacitor plate is located on the connector tab such that the plurality of tuning capacitor plates and the common capacitor plate are located opposite each other after the folding, and further wherein the first connection pad faces the second connection pad after the folding;

locating a dielectric layer between the common capacitor plate and each of the tuning capacitor plates, wherein the common capacitor plate and the tuning capacitor plates are separated by the dielectric layer after the folding;

placing the first connection pad in electrical communication with the second connection pad;

measuring a resonant frequency of the device; and selectively severing at least one of the tuning capacitor plate connections.

22. A radio frequency identification tag device comprising:

a substrate comprising first and second major surfaces, a first portion of the substrate forming a connector tab, wherein the substrate is folded along a connector tab fold line such that the first major surface of the substrate located within the connector tab faces the first major surface of the substrate outside of the connector tab;

an antenna located on the first major surface of the substrate;

a first connection pad located on the first major surface of the substrate within the connector tab;

a second connection pad located on the first major surface of the substrate outside of the connector tab, wherein the first and second connection pads face each other and are in electrical communication with each other; and a capacitor comprising a common capacitor plate in electrical communication with the antenna and a plurality of tuning capacitor plates separated from the common capacitor plate by a dielectric layer, each of the plurality of the tuning capacitor plates in electrical communication with the antenna through a tuning capacitor plate connection, wherein only one of the common capacitor plate or the plurality of tuning capacitor plates is located within the connector tab.

23. A device according to claim 22, wherein the connector tab is defined by the connector tab fold line and a separation line formed in the substrate.

24. A device according to claim 22, further comprising adhesive located between the common capacitor plate and each of the tuning capacitor plates.

25. A device according to claim 22, wherein the capacitor comprises a dielectric layer comprising a backing and adhesive located on each of two major surfaces of the backing.

26. A device according to claim 22, further comprising electrically conductive adhesive between the first and second connection pads.

27. A device according to claim 22, further comprising a die connection site located on the first major surface of the substrate, the die connection site in electrical communication with the antenna.

28. A device according to claim 27, further comprising a die attached to the die connection site.

29. A device according to claim 22, further comprising at least one disconnected tuning capacitor plate located opposite the common capacitor plate and separated from the common capacitor plate by the dielectric layer, wherein the disconnected tuning capacitor plate is not in electrical communication with the antenna.

30. A device according to claim 22, wherein a second portion of the substrate forms a dielectric tab, and further wherein the dielectric tab is folded along a dielectric tab fold line, and still further wherein the dielectric tab forms at least a portion of the dielectric layer of the capacitor.

31. A radio frequency identification tag device comprising:

a substrate comprising first and second major surfaces, a first portion of the substrate forming a connector tab defined by a connector tab fold line and a separation line formed in the substrate, wherein the substrate is folded along the connector tab fold line such that the first major surface of the substrate located within the connector tab faces the first major surface of the substrate outside of the connector tab;

an antenna located on the first major surface of the substrate;

a first connection pad located on the first major surface of the substrate within the connector tab;

a second connection pad located on the first major surface of the substrate outside of the connector tab, wherein the first and second connection pads face each other and are in electrical communication with each other;

a capacitor comprising a common capacitor plate in electrical communication with the antenna and a plurality of tuning capacitor plates separated from the common capacitor plate by a dielectric layer, each of the plurality of the tuning capacitor plates in electrical communication with the antenna through a tuning capacitor plate connection, wherein only one of the common capacitor plate or the plurality of tuning capacitor plates is located within the connector tab; and at least one disconnected tuning capacitor plate located opposite the common capacitor plate and separated from the common capacitor plate by the dielectric layer, wherein the disconnected tuning capacitor plate is not in electrical communication with the antenna.

* * * * *

UNITED STATES PATENT AND TRADEMARK OFFICE
CERTIFICATE OF CORRECTION

PATENT NO. : 6,407,669 B1
DATED : June 18, 2002
INVENTOR(S) : Brown, Katherine A.

It is certified that error appears in the above-identified patent and that said Letters Patent is hereby corrected as shown below:

Column 3,
Line 16, "Within" should read -- within --.
Line 66, insert -- a -- following "forming".

Column 11,
Line 19, insert -- . -- following "thereof".

Signed and Sealed this

Third Day of February, 2004

JON W. DUDAS
*Acting Director of the United States Patent and Trademark Office*